US011709025B2

(12) United States Patent
Nyander et al.

(10) Patent No.: US 11,709,025 B2
(45) Date of Patent: *Jul. 25, 2023

(54) END-PIECE AND PLATE HEAT EXCHANGER COMPRISING, AND METHOD OF MAKING, SUCH END-PIECE

(71) Applicant: ALFA LAVAL CORPORATE AB, Lund (SE)

(72) Inventors: Anders Nyander, Staffanstorp (SE); Klas Bertilsson, Eslöv (SE); Clemens Wictor, Ängelholm (SE)

(73) Assignee: ALFA LAVAL CORPORATE AB, Lund (SE)

( * ) Notice: Subject to any disclaimer, the term of this patent is extended or adjusted under 35 U.S.C. 154(b) by 56 days.

This patent is subject to a terminal disclaimer.

(21) Appl. No.: 17/522,379

(22) Filed: Nov. 9, 2021

(65) Prior Publication Data

US 2022/0065559 A1 Mar. 3, 2022

Related U.S. Application Data

(62) Division of application No. 14/400,759, filed as application No. PCT/EP2013/060581 on May 23, 2013, now Pat. No. 11,231,240.

(30) Foreign Application Priority Data

Jun. 4, 2012 (EP) .................................. 12170669

(51) Int. Cl.
*F28F 9/02* (2006.01)
*F28F 9/00* (2006.01)
(Continued)

(52) U.S. Cl.
CPC ............ *F28F 9/0251* (2013.01); *B23P 15/26* (2013.01); *F28D 9/00* (2013.01); *F28F 9/001* (2013.01);
(Continued)

(58) Field of Classification Search
CPC ...... F28F 9/0251; F28F 9/001; F28F 2225/02; B23P 15/26; F28D 9/00; F28D 9/0087; Y10T 29/4935
(Continued)

(56) References Cited

U.S. PATENT DOCUMENTS 2,379,671 A 7/1945 Vivian
3,834,544 A 9/1974 Tyson, Jr. et al.
(Continued)

FOREIGN PATENT DOCUMENTS

CN 1688856 A 10/2005
CN 101922869 A 12/2010
(Continued)

OTHER PUBLICATIONS

English translation of Sumitomo JP62-621187 Mar. 18, 1987.*
(Continued)

*Primary Examiner* — Joel M Attey
(74) *Attorney, Agent, or Firm* — Buchanan Ingersoll & Rooney PC (57) ABSTRACT

A method of making an end-piece for a plate heat exchanger, wherein the end-piece includes a frame part having inner and outer portions, and an intermediate portion arranged between the inner and outer portions, with the outer wall surface of the inner portion being arranged to face a first surface of a package of heat transfer plates comprising the plate heat exchanger, and the first surface having a center portion and a peripheral portion encircling the center portion. The method includes extruding the frame part with plural cavities in the intermediate portion of the frame part that extend in the extrusion direction of the frame part and that are parallel to the frame part axis, with outer dimensions of the outer wall surface of the inner portion configured to
(Continued)

be at least as large as outer dimensions of the center portion of the first surface heat transfer plate package.

20 Claims, 8 Drawing Sheets

(51) Int. Cl.
    *B23P 15/26*     (2006.01)
    *F28D 9/00*     (2006.01)

(52) U.S. Cl.
    CPC ........ *F28D 9/0087* (2013.01); *F28F 2225/02* (2013.01); *Y10T 29/4935* (2015.01)

(58) Field of Classification Search
    USPC ........................................................ 165/157
    See application file for complete search history.

(56) References Cited

U.S. PATENT DOCUMENTS

| | | | |
|---|---|---|---|
| 3,839,204 | A | 10/1974 | Ingenito et al. |
| 4,016,081 | A | 4/1977 | Martinez et al. |
| 4,256,692 | A | 3/1981 | Cover |
| 5,033,543 | A | 7/1991 | Nilsson et al. |
| 6,098,701 | A | 8/2000 | Blomgren |
| 6,234,238 | B1 | 5/2001 | Koyama et al. |
| 6,360,811 | B1 | 3/2002 | Toh et al. |
| 7,044,203 | B2 | 5/2006 | Yagi et al. |
| 2008/0156455 | A1 | 7/2008 | Powers et al. |
| 2012/0175092 | A1* | 7/2012 | Otahal ............... F28F 9/02 165/166 |
| 2013/0319634 | A1 | 12/2013 | Sheppard et al. |
| 2014/0262144 | A1 | 9/2014 | Erb et al. |

FOREIGN PATENT DOCUMENTS

| | | |
|---|---|---|
| CN | 203881198 U | 10/2014 |
| DE | 4420133 A1 | 12/1995 |
| EP | 0122022 A2 | 10/1984 |
| EP | 0265528 A1 | 5/1988 |
| EP | 1645829 A2 | 4/2006 |
| EP | 2672214 A1 | 12/2013 |
| FR | 2267815 A1 | 11/1975 |
| JP | 59044533 A | 3/1984 |
| JP | 62062187 A | 3/1987 |
| JP | S62252891 A | 11/1987 |
| JP | 11047960 A | 2/1999 |
| JP | 2004108672 A | 4/2004 |
| JP | 2005528578 A | 9/2005 |
| WO | 9923434 A1 | 5/1999 |
| WO | 03102482 A1 | 12/2003 |
| WO | 2009152988 A1 | 12/2009 |
| WO | 2009153022 A1 | 12/2009 |
| WO | 2010104449 A1 | 9/2010 |
| WO | 2011006825 A2 | 1/2011 |

OTHER PUBLICATIONS

An English Translation of the Office Action with Search Report dated Jan. 8, 2016, by the Taiwanese Patent Office in corresponding Taiwanese Patent Application No. 102118601. (6 pages).
English language version of the Office Action (Notice of Reasons for Rejection) dated Nov. 30, 2015, issued by the Japanese Patent Office in the corresponding Japanese Patent Application No. 2015-515464. (6 pages).
English translation of Office Action dated Dec. 1, 2014 in corresponding Chinese Patent Application No. 201310218391.X. (4 pages).
International Search Report (PCT/ISA/210) dated Jul. 10, 2013, by the European Patent Office as the International Searching Authority for International Application No. PCT/EP2013/060581.
Office Action (Decision of Rejection) dated Nov. 7, 2016, by the Japanese Patent Office in corresponding Japanese Patent Application No. 2015-515464 in English. (3 pages).
Written Opinion (PCT/ISA/237) dated Jul. 10, 2013, by the European Patent Office as the International Searching Authority for International Application No. PCT/EP2013/060581.
English translation of JPS 62-62187 Sumitomo.

* cited by examiner

END-PIECE AND PLATE HEAT EXCHANGER COMPRISING, AND METHOD OF MAKING, SUCH END-PIECE

CROSS-REFERENCES TO RELATED APPLICATIONS

This application is a divisional of U.S. patent application Ser. No. 14/400,759 filed on Nov. 12, 2014, which is a U.S. national stage application based on International Patent Application No. PCT/EP2013/060581 filed on May 23, 2013, which claims priority to European Patent Application No. 12170669.1 filed on Jun. 4, 2012, the entire content of all three of which is incorporated herein by reference.

TECHNICAL FIELD

The invention relates to an end-piece for a plate heat exchanger, a plate heat exchanger comprising such an end-piece and a method of making such an end-piece. The end-piece comprises a frame part, which frame part has an inner portion, an outer portion and an intermediate portion arranged between the inner and outer portions. An outer wall surface of the inner portion is arranged to face a first surface of a package of heat transfer plates comprised in the plate heat exchanger. The first surface has a center portion and a peripheral portion encircling the center portion.

BACKGROUND ART

Plate heat exchangers, or PHEs, typically consist of two end-pieces or plates in between which a number of heat transfer plates are arranged in an aligned manner, in a package. In one type of well-known PHEs, the so called gasketed plate heat exchangers, gaskets are arranged between the heat transfer plates. The end plates, and therefore the heat transfer plates, are pressed towards each other whereby the gaskets seal between the heat transfer plates. The gaskets define parallel flow channels between the heat transfer plates through which channels two fluids of initially different temperatures can flow for transferring heat from one fluid to the other.

The end plates of a gasketed plate heat exchanger are normally referred to as frame plate and pressure plate. The frame plate is often fixed to a support surface such as the floor while the pressure plate is movable in relation to the frame plate. A carrying bar for carrying the pressure plate as well as the heat transfer plates extends from an upper part of the frame plate while a guide bar for guiding the pressure and heat transfer plates extends from a lower part of the frame plate. Further, the frame and pressure plates are connected to each other by means of a number of pair wise cooperating bolts and nuts. The bolts typically extend through respective openings in opposite edge portions of the pressure plate and the frame plate such that the heat transfer plates are arranged within the bolts. Bolt heads of the bolts engage with an outside surface of the frame plate while the nuts engage with the bolts and with an outside surface of the pressure plate. By rotating the nuts in relation to the respective bolts, the pressure between the frame and pressure plates can be regulated.

To obtain a tight plate heat exchanger with flow channels that do not leak, the frame and pressure plates must be pressed hard towards each other. However, since the bolts engage with the edge portions of the frame and pressure plates, there is a risk of outwards bulging of center portions of the plates, especially when the fluids pass through the channels of the plate heat exchanger. In turn, such outwards bulging may cause an uneven flow through the channels leading to reduced thermal performance of the plate heat exchanger or even leaking channels. To make sure that this does not happen, the frame and pressure plates are relatively thick, which makes them heavy and material consuming.

SUMMARY

The end-piece for a plate heat exchanger disclosed here is light and material effective as compared to prior art. The basic concept of the disclosure here is to provide an end-piece which is non-solid. Other objects of the present invention are to provide a plate heat exchanger comprising, and a method of making, such an end-piece. The new methods disclosed here are defined in the appended claims and discussed below.

An end-piece for a plate heat exchanger according to the present invention comprises a frame part. The frame part has an inner portion, an outer portion and an intermediate portion arranged between the inner and outer portions. An outer wall surface of the inner portion is arranged to face a first surface of a package of heat transfer plates comprised in the plate heat exchanger, which first surface has a center portion and a peripheral portion encircling the center portion. The end-piece is characterized in that the frame part is extruded and in that the intermediate portion of the frame part comprises a first number of cavities extending in an extrusion direction of the frame part. The extrusion direction is parallel to an axis of the frame part. The end-piece is further characterized in that outer dimensions of the outer wall surface of the inner portion are at least as large as outer dimensions of the center portion of the first surface of the package of heat transfer plates.

Since the frame part is extruded, it may be integrally formed. Thus, the extrusion makes it possible to manufacture the frame part in a relatively straightforward way since additional assembly operations, such as welding or mechanical fastening, may not be necessary to obtain the cavity structure of the frame part.

Further, since the frame part is extruded, a cross section of it is constant along said axis just after extrusion, i.e. prior to any machining of the frame part. The extrusion makes it easy to manufacture frame plates adapted for different plate heat exchanger sizes since extruded lengths easily can be cut, transverse to said axis, to the desired measure. Also, the extrusion makes it possible to manufacture frame parts, and thus end-pieces, with designs that would have been very hard to realize with other manufacturing techniques. Additionally, the characteristics of the frame part can be easily adapted to the specific type of plate heat exchanger by the use of a suitable extrusion die.

Since the frame part comprises cavities, which "by default" will be filled with air, air being a better insulator than many extrudable materials, the frame part may have a relatively good insulating property which may contribute positively to the heat transfer efficiency of the plate heat exchanger. Also, this feature may reduce the risk of getting burned on an outer portion of the frame part.

In a plate heat exchanger, the fluids typically flow through a center of the package of heat transfer plates, i.e. between respective center portions of the heat transfer plates. Depending on the type of plate heat exchanger, the fluids may also, but doesn't have to, flow outside the center of the package of heat transfer plates, i.e. between respective peripheral portions of the heat transfer plates. The center portions of heat transfer plates together define the center portion of the first surface of the heat transfer plate package. Similarly, the peripheral portions of the heat transfer plates together define the peripheral portion of the first surface of the heat transfer plate package. Since the outer wall surface of the inner portion of the frame part has outer dimensions which are at least as large as the outer dimensions of the center portion of the first surface of the heat transfer plate package, the outer wall surface may cover (at least partly— inlets and outlets may extend through the frame part as will be further discussed below) the center portion of the first surface of the plate package as seen in a normal direction of the outer wall surface. The outer wall surface may be large enough to cover also the peripheral portion of the first surface of the plate package which could be beneficial if the intended plate heat exchanger is of a type where the fluids flow also outside the center of the package of heat transfer plates. An example of a plate heat exchanger where the fluids may flow through a center of the plate package only is a gasketed plate heat exchanger where the gaskets between the plates may define the center of the plate package. An example of a plate heat exchanger where the fluids may flow through the complete plate package, i.e. also outside the center thereof, is an all-welded plate heat exchanger.

It should be stressed that the expression "outer wall surface covering (at least partly) the first surface of the plate package" doesn't mean that the outer wall surface must be in contact with, or even immediately adjacent to, the package of heat transfer plates. For example, a gasket, a reinforcement plate, a distance plate, or similar, could be arranged between the outer wall surface and the heat transfer plate package.

It should be stressed the first surface corresponds to a surface of an imaginary continuous plane delimiting the three-dimensional object formed by the heat transfer plates when these are aligned in the package.

The end-piece can be so constructed that the intermediate portion of the frame part comprises a second number of partition walls which extend between the outer and inner portions of the frame part. An inner wall surface of the outer portion comprises a third number of outer connection areas. Similarly, an inner wall surface of the inner portion comprises a fourth number of inner connection areas. Each of the partitioning walls may join the outer portion along one of the outer connection areas and the inner portion along one of the inner connection areas. By giving these partitioning walls a suitable positioning, a relatively strong frame part can be manufactured of a relatively small amount of material.

The number, position and design of the partitioning walls can be adapted to the specific plate heat exchanger type.

The partition walls may function as reinforcements which may strengthen the frame part considerably in a material effective way since the cavities may occupy the complete space between two adjacent partitioning walls and thus be relatively large.

The inner wall surface of the outer portion of the frame part may be essentially plane between two adjacent outer connection areas thereof. This design is advantageous since it may reduce, or even eliminate, bending moment in the outer portion of the frame part when this is subjected to stress striving to straighten the outer portion.

The end-piece may be so such that a distance between an outer wall surface of the outer portion and the outer wall surface of the inner portion of the frame part is larger in a center section of the frame part than outside the center section, which center section extends along said axis of the frame part. Such a design is beneficial in that the center section of the frame part becomes more resistant to deformation when the frame part is subjected to certain types of stress.

As an example of a frame plate design that fulfills the above specified distance relationship, the outer wall surface of the outer portion of the frame part may be outwards vaulted as seen from the intermediate portion of the frame part.

As another example of a frame plate design that fulfills the above specified distance relationship, the outer wall surface of the inner portion of the frame part may be outwards vaulted as seen from the intermediate portion of the frame part.

The end-piece may be so constructed that a thickness of the outer portion of the frame part is less than a thickness of the inner portion of the frame part. Naturally, thinner portions are advantageous from an economical point of view.

According to one embodiment of the inventive end-piece, each of the outer and inner portions of the frame part has two opposite first sides which are parallel to said axis, along which first sides the outer and inner portions are connected to each other. Thereby, the frame part comprises a closed casing enclosing the intermediate portion which is beneficial as regards primarily the strength, but also the hygiene (dirt prevented from entering the cavities), of the frame part.

The end-piece may further comprise a sixth number of bars extending inside the intermediate portion of the frame part. These bars can be designed and positioned in different ways so as to improve different characteristics of the frame plate or add further functions thereto. As an example, each of the bars may extend along a respective one of the cavities inside the frame part. Arranged like that, the bars may function to reinforce the frame part. Further, at least one of the bars may extend outside the frame part and project from one of two opposite second sides thereof. Arranged like that, the bars may function as a support and/or lifting means of the frame part.

Moreover, the frame part may comprise at least one recess extending through the outer and inner portions thereof. Further, at least one of the bars may comprise at least one hole coinciding with said at least one recess of the frame part. Thereby, cooperation between the frame part and said at least one of the bars may be facilitated.

The outer wall surface of the inner portion may be adapted to be arranged parallel to an extension plane of the heat transfer plates of the plate heat exchanger. In connection with such an embodiment, the end piece may be arranged to be pressed towards another opposing end piece for compression of the heat transfer plate package arranged there between, as was mentioned by way of introduction.

Alternately, the outer wall surface of the inner portion may be adapted to be arranged perpendicular to an extension plane of the heat transfer plates of the plate heat exchanger. Such an embodiment may be used in connection with other types of plate heat exchangers than the initially described one, such as all-welded plate heat exchangers, as will be further discussed below.

The frame part may comprise a plurality of extruded modules connected along the extrusion direction. It is difficult to extrude very wide objects, inter alia because of the very high forces required to force extrusion material through a large die or mould. Therefore, in reality, there is typically a limitation as regards how wide objects that can be extruded. Thus, this embodiments enables provision of end-pieces with, theoretically, unlimited width which means that the present invention also may be used in connection with relatively large plate heat exchangers. The modules may be connected to each other essentially directly after extrusion or they may be connected to each other at a later stage. The latter alternative may be advantageous in that it may facilitate handling, such as transportation, of the end-piece.

A plate heat exchanger according to the present invention comprises an end-piece as described above and a package of heat transfer plates. The outer wall surface of the inner portion of the frame part of the end-piece faces a first surface of the package of heat transfer plate. The first surface has a center portion and a peripheral portion encircling the center portion. Outer dimensions of the outer wall surface of the inner portion are at least as large as outer dimensions of the center portion of the first surface of the package of heat transfer plates.

The outer wall surface of the inner portion of the end piece may be arranged parallel or perpendicular to an extension plane of the heat transfer plates.

The inventive method of making an end-piece for a plate heat exchanger, which comprises a frame part having an inner portion, an outer portion and an intermediate portion arranged between the inner and outer portions, an outer wall surface of the inner portion being arranged to face a first surface of a package of heat transfer plates comprised in the plate heat exchanger, said first surface having a center portion and a peripheral portion encircling the center portion, is characterized in comprising the step of extruding the frame part with a number of cavities comprised in the intermediate portion of the frame part. The cavities extend in an extrusion direction of the frame part, which extrusion direction is parallel to an axis of the frame part. The method is further characterized in comprising extruding the frame part with outer dimensions of the outer wall surface of the inner portion at least as large as outer dimensions of the center portion of the first surface of the package of heat transfer plates.

The method enables extrusion of long frame part lengths, which lengths at a later stage can be cut in different shorter lengths as desired. Thereby, the present invention enables a very fast and flexible manufacture of plate heat exchanger end pieces.

Another aspect involves a method of making an end-piece having a longitudinal axis and configured for use in a plate heat exchanger that includes a package of heat transfer plates. The method includes extruding a frame part in an extrusion direction parallel to the longitudinal axis so that the frame part comprises an inner portion, an outer portion spaced from the inner portion, and an intermediate portion between the inner portion and the outer portion, with the inner portion of the frame part possessing an outer wall surface configured to face a first surface of the package of heat transfer plates. The extruding of the frame part comprises extruding the frame part so that the intermediate portion of the frame part comprises a plurality of cavities extending in the extrusion direction and separated from one another.

Another aspect involves a method comprising extruding a frame part in an extrusion direction to produce an extruded frame part comprising an inner portion, an outer portion having an inner wall surface facing towards and spaced from an inner wall surface of the inner portion, and an intermediate portion between the inner wall surface of the inner portion and the inner wall surface of the outer portion, with the inner portion of the extruded frame part possessing an outer wall surface opposite the inner wall surface of the inner portion of the extruded frame part. The extruding of the frame part involves extruding the frame part so that the intermediate portion of the extruded frame part comprises a plurality of cavities extending in the extrusion direction and separated from one another. The method additionally comprises positioning a package of heat transfer plates between the extruded frame part, which constitutes one end-piece of a plate heat exchanger, and a second end-piece so that the outer wall surface of the extruded frame part faces a first surface of the package of heat transfer plates, wherein the first surface of the package of heat transfer plates includes a center portion and a peripheral portion encircling the center portion, and the outer wall surface of the inner portion possesses outer dimensions at least as large as outer dimensions of the center portion of the first surface of the package of heat transfer plates.

BRIEF DESCRIPTION OF THE DRAWINGS

The plate heat exchanger end-piece, plate heat exchanger comprising such an end-piece and an end-piece manufacturing method will now be described in more detail with reference to the appended schematic drawings, in which.

DETAILED DESCRIPTION

Figure 16:
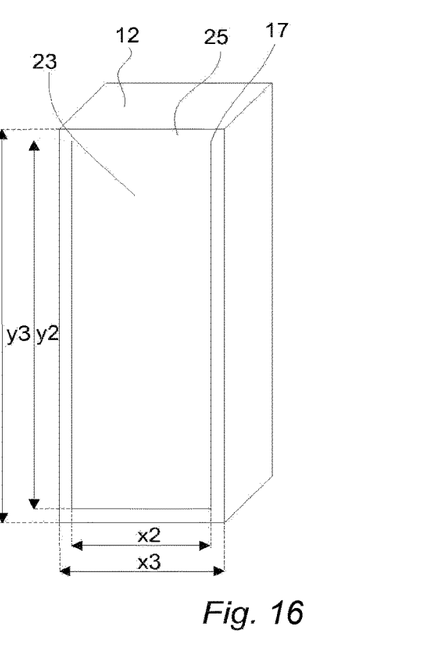
FIG. 16 is a schematic perspective view of a package of heat transfer plates.

With reference to FIGS. 1-4 a gasketed plate heat exchanger 2 is shown. It comprises a first end-piece 4 and a second end-piece 6, which correspond to the frame and the pressure plate, respectively, of the initially described known plate heat exchanger. The first end-piece 4 comprises a first frame part 8 while the second end-piece comprises a second frame part 10. A stack or package 12 of heat transfer plates 13, illustrated separately and schematically in FIG. 16, is arranged between an inner portion 14 of the first frame part 8 and thus the first end-piece 4 and an inner portion 16 of the second frame part 10 and thus the second end-piece 6. More particularly, an outer wall surface 15 of the inner portion 14 faces a first surface 17, while an outer wall surface 19 of the inner portion 16 faces a second opposing surface 21, of the package 12 of heat transfer plates 13. The inner portions 14 and 16, and thus the outer wall surfaces 15 and 19, have outer dimensions x1 and x2. The first and second surfaces of the heat transfer plate package are parallel to an extension plane of the heat transfer plates, which extension plane is perpendicular to a figure planes of FIGS. 2 and 3, and they have outer dimensions x3 and y3. Further, the first and second surfaces each has a center portion, with outer dimensions x2 and y2, and a peripheral portion encircling the center portion, which portions are visible in FIG. 16 only for the first surface 17 and denoted 23 and 25, respectively. As is clear from the figures, the inner portions 14 and 16 of the first and second end-pieces 4 and 6 extend outside the heat transfer plate package 12 in a direction x. In a direction y, the extension of the first and second frame parts and the plate package 12 is essentially the same. In other words, x1>x3>x2 and y1=y3>y2.

The heat transfer plates 13, which are not illustrated separately herein, are essentially rectangular sheets of stainless steel provided with a certain pattern or profile and a number of fluid inlet and outlet ports. They are arranged aligned in succession and separated from each other by gaskets (not shown). The heat transfer plates 13 together with the gaskets form parallel channels arranged to receive two fluids for transferring heat from one fluid to the other. To this end, a first fluid is arranged to flow in every second channel and a second fluid is arranged to flow in the remaining channels. The fluids are fed to and from the plate heat exchanger 2 through inlets and outlets, which are in fluid communication with the fluid inlet and outlet ports of the heat transfer plates 13 and extend through the first end-piece 4. In the figures, the inlets and outlets are jointly denoted 18.

To align and support the heat transfer 13 plates between the first and second end-pieces 4 and 6, the plate heat exchanger 2 further comprises a carrying bar 20 fixed to, and extending in a horizontal direction from, a top of the first end-piece 4 through a top of the second end-piece 6. Further, a guide bar 22 is fixed to, and extends in the horizontal direction from, a bottom of the first end-piece 4 through a bottom of the second end-piece 6. Moreover, the free ends of the carrying and guide bars 20 and 22, respectively, are fixed to a support rod 24 for increased stability. For engagement with the carrying and guide bars, the heat transfer plates 13, as well as the first and second frame parts, are provided with respective recesses in a top edge and a bottom edge thereof.

For the channels between the heat transfer plates to be leak proof when the first and second fluids flow there through, the stack or package 12 of heat transfer plates must be compressed, i.e. the first and second end-pieces 4 and 6 must be pressed towards each other. To this end, the plate heat exchanger 2 further comprises four threaded bolts 26 and four nuts 28, and the first and second end-pieces 4 and 6, or more particularly the first and second frame parts 8 and 10, are each provided with four recesses 30 which are distributed along two opposite first or long sides 32 & 34, and 36 & 38, respectively, of the first and second frame parts. Each of the bolts 26 extends through one of the recesses of the first frame part 8 and the corresponding one of the recesses of the second frame part 10 to engage with one of the nuts 28. Bolt heads 26' of the bolts 26 engage with the first frame part 8 while the nuts engage with the second frame part 10 to connect the first and second end-pieces to each other. By tightening the nuts 28, the first and second end-pieces are pressed harder towards each other.

The general functioning and design of a gasketed plate heat exchanger is well known and will not be described in detail herein.

The essence of the present invention lies within the unique design of the first and second end-pieces 4 and 6, respectively. The construction of the first and second end-pieces is essentially the same. For the sake of simplicity, below, focus will be on the first end-piece 4.

Figure 5:
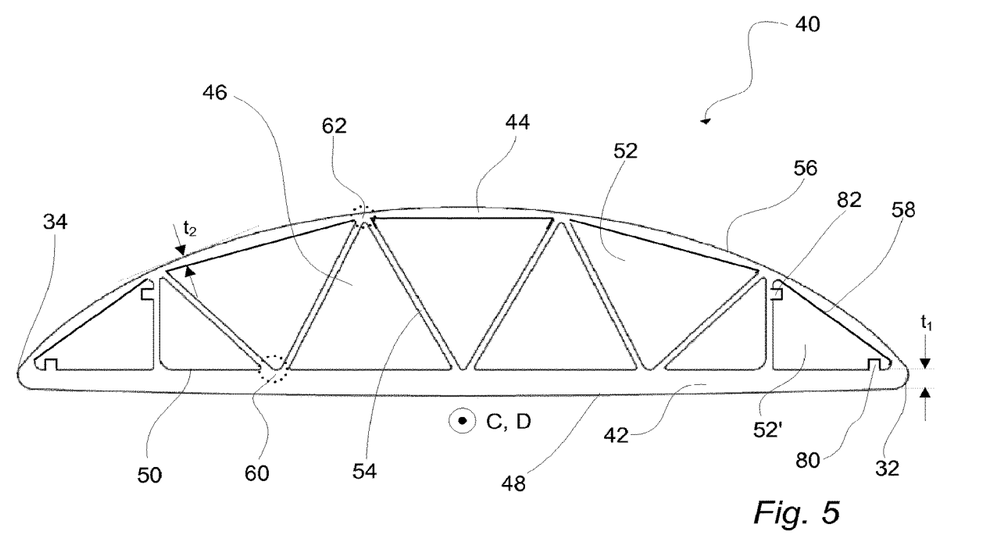
FIG. 5 is a top view of a frame object for producing the plate heat exchanger of FIG. 1.
Figure 6:
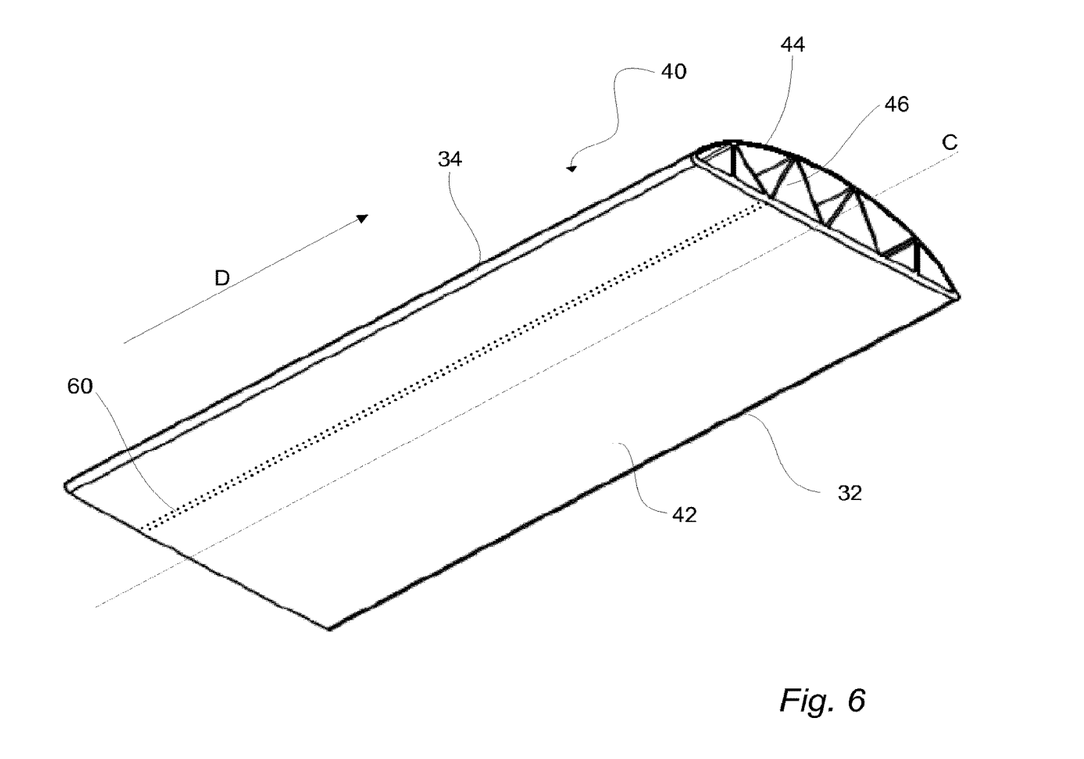
FIG. 6 is a perspective view of the frame object of FIG. 5.

As mentioned above, the first end-piece 4 comprises a first frame part 8. The first frame part 8 is produced from a frame object 40 which is illustrated in FIGS. 5 and 6. More particularly, the first frame part 8 is obtained by milling the above mentioned recesses in the frame object 40. Thus, the below discussed features of the frame object 40 are also features of the first frame part 8 and the expressions first frame part and frame object are alternately used herein after.

The frame object 40 is made of aluminum and produced by extrusion with an extrusion direction D which is parallel to a longitudinal axis C of the frame object. Therefore, a cross section of the frame object 40 is constant along the longitudinal axis C. The frame object 40 has an inner portion 42, an outer portion 44 and an intermediate portion 46. The inner portion 42, which in fact comprise the previously mentioned inner portion 14 of the first end-piece 4, is a solid wall with a, as seen from within the frame object, convex or outwards relatively slightly cambered or vaulted outer wall surface 48 and a plane inner wall surface 50. Thus, a thickness $t_1$ of the inner portion 42 is varying transverse to the longitudinal axis C of the first frame part 8 such that it is increasing from the long sides 32, 34 and inwards. The intermediate portion 46 comprises nine cavities 52 separated from each other by eight partitioning walls 54, the cavities and the partitioning walls extending along the longitudinal axis C of the first frame part 8. The outer portion 44 is an, as seen from within the frame object, outwards curved or vaulted solid wall with a smooth outer wall surface 56 and a cornered inner wall surface 58.

Each of the partitioning walls 54 extends between the inner portion 42 and the outer portion 44 of the first frame part 8. More particularly, the inner wall surface 50 of the inner portion 42 comprises five inner connection areas 60, of which one is illustrated with broken lines in FIGS. 5 and 6, while the inner wall surface 58 of the outer portion 44 comprises four outer connection areas 62, of which one is illustrated with broken lines in FIG. 5. All connection areas extend along the longitudinal axis C of the first frame part 8. Each of the partitioning walls 54 joins the inner portion 42 along one of the inner connection areas 60 and the outer portion 44 along one of the outer connection areas 62. As apparent from the figures, one or two partitioning walls join each of inner connection areas 60 while two partitioning walls join each of the outer connection areas 62. The inner wall surface 58 of the outer portion 44 is plane between each two adjacent outer connection areas 62, which is why the inner wall surface is cornered, as above mentioned. Since the outer wall surface 56 is smooth and the inner wall surface 58 is cornered, a thickness $t_2$ of the outer portion 44 is varying transverse to the longitudinal axis C of the first frame part 8 and between two adjacent outer connection areas such that it is increasing from the outer connection areas 62 and inwards.

Thus, returning again to FIGS. 1-4, when assembling the plate heat exchanger 2, the stack 12 of heat transfer plates is arranged between the first and second end-pieces 4 and 6 such that the plates engage with the carrying bar 20 and the guide bar 22. The bolts 26 are inserted through a respective one of the recesses 30 of the first frame part 8 and a corresponding one of the recesses 30 of the second frame part 10. The nuts 28 are screwed onto a respective one of the bolts 26 and tightened to press the first and second end-pieces 4 and 6 towards each other. When the distance between the first and second end-pieces is the desired one, the plate heat exchanger 2 is ready for use, i.e. the channels of the plate heat exchanger are ready to receive the fluids between which heat is to be transferred. Since the nuts and bolts engages with edge sections of the frame parts 8 and 10, the stress in the frame parts 8 and 10, which is as its largest when the fluids pass through the plate heat exchanger 2, will increase from the edge portions and inwards and be at its largest halfway between the edge portions. However, since the both the inner and outer portions (denoted 42 and 44, respectively, for the frame object 40) of the frame parts 8 and 10 are bulging outwards, the frame parts are at their strongest in a respective center section (denoted 64 for the first frame part 8 and illustrated with broken lines in FIG. 1) of the same. Therefore, the frame parts 8 and 10 can resist deformation when put under stress. Further, the fact that the inner wall surfaces (denoted 58 for the frame object 40) of the outer portions of the frame parts are plane between the respective outer connection areas, makes the frame parts even more resistant towards deformation since essentially no bending moment but just tensile stress arise in the outer portions when the first and second end-pieces 4 and 6 are pressed towards each other.

Before the pressing begins, the inner portions 14 and 16 of the first and second end-pieces 4 and 6, respectively, are outwards bulging, as discussed above. Thereby, when the pressing begins, the heat transfer plates of the stack 12 are forced towards each other in a center portion thereof during a "pre-tightening". As the nuts 28 are further tightened, the outwards bulging of the inner portions 14 and 16 is gradually decreasing. When the desired compression of the stack 12 is obtained, the nuts are not further tightened. In this state, i.e. when the plate heat exchanger is ready for use, the outwards bulging is essentially zero. This means that the outer wall surfaces of the inner portions 14 and 16 (denoted 48 or 15 for the inner portion 14, and 19 for the inner portion 16) are essentially plane which is advantageous to obtain a leak-proof plate heat exchanger.

As mentioned above, the heat transfer plates of the stack 12 are separated from each other by gaskets. Although not visible in the figures, gaskets are also present between the first and second end-pieces 4 and 6 and the stack 12 of heat transfer plates. Thus, the inner portions 14 and 16 of the first and second end-pieces 4 and 6 are not supported all over the outer wall surfaces (denoted 48 or 15 for the first frame part 8, and 19 for the inner portion 16). Uneven support is also due to the pattern of the heat transfer plates. Therefore, to resist deformation due to this partial support, the inner portions are relatively thick. More particularly, the thickness $t_1$ of the inner portions are larger than the thickness $t_2$ of the outer portions.

Figure 7:
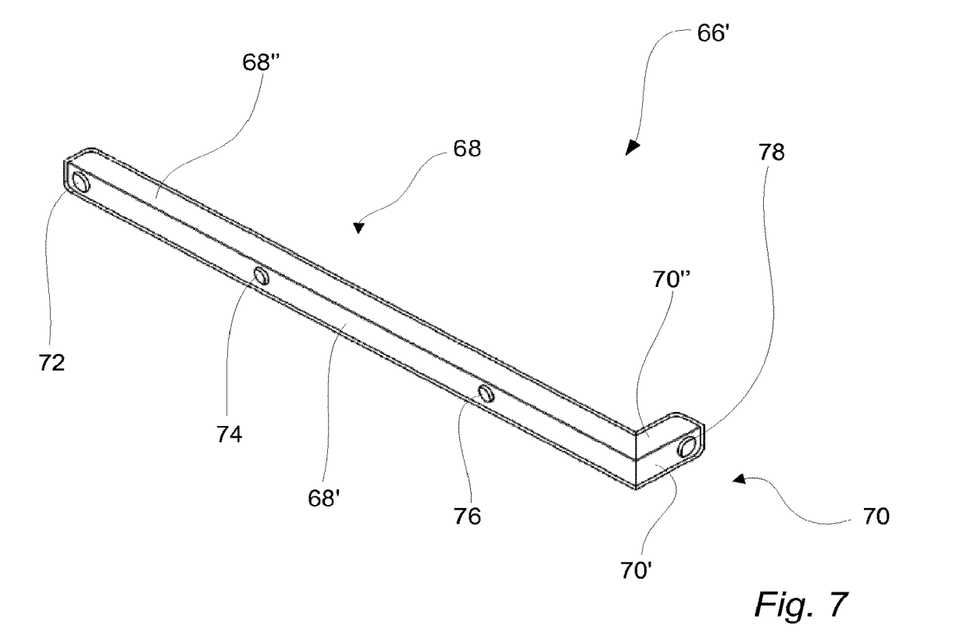
FIG. 7 is a perspective view of a bar of the plate heat exchanger of FIG. 1.

Each of the first and second end pieces 4 and 6 further comprises two similar but mirror-inverted bars 66, one of which is denoted 66' and illustrated separately in FIG. 7. The bar 66' is made of carbon steel and composed of a longer first part 68 with an L-shaped cross section, i.e. two legs 68' and 68", and a shorter second part 70 with the same L-shaped cross section, i.e. two legs 70' and 70". The first and second parts 68 and 70, respectively, are permanently joined in the form of an L. The leg 68' of the first part 68 comprises three holes 72, 74 and 76 while the leg 70' of the second part 70 comprises one hole 78. The bar 66' is arranged to extend through an outer cavity 52' of the cavities 52 of the intermediate portion 46 of the first frame part 8, parallel to the longitudinal axis C thereof. More particularly, the leg 68' of the bar 66' is arranged to engage with the inner wall surface 50 of the inner portion 14 while the leg 68" of the bar 66' is arranged to engage with the partitioning wall 54 delimiting the outer cavity 52'. For correct positioning of the bar 66' inside the cavity 52', the first frame part 8 comprises a projection 80 extending from the inner wall surface 50 and a projection 82 extending from the partitioning wall 54 delimiting the outer cavity 52'. The projections 80 and 82 are arranged to engage with a respective distal edge of the legs 68' and 68".

Figure 1:
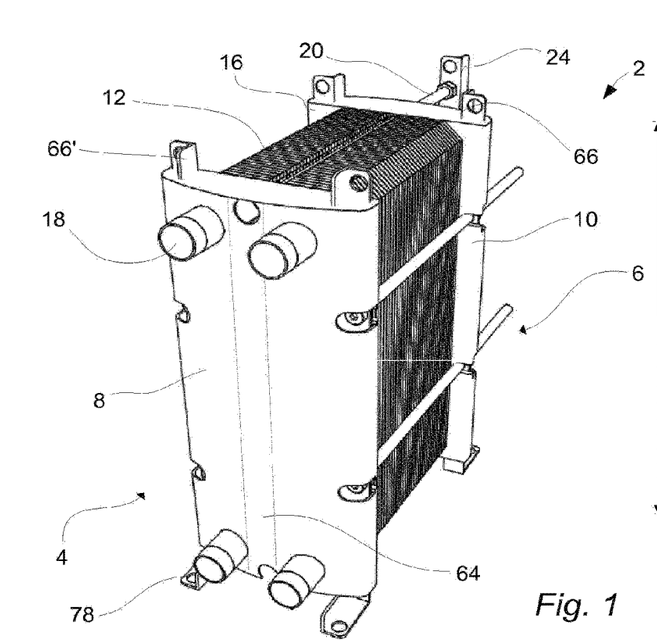
FIG. 1 is a perspective view of a gasketed plate heat exchanger.
Figure 2:
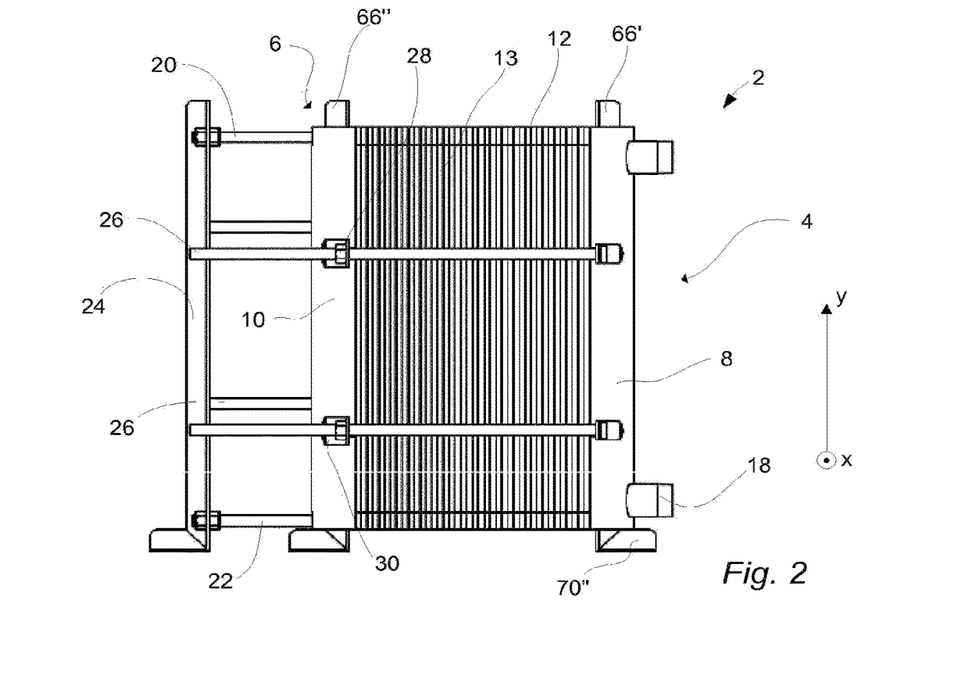
FIG. 2 is a side view of the plate heat exchanger of FIG. 1.
Figure 3:
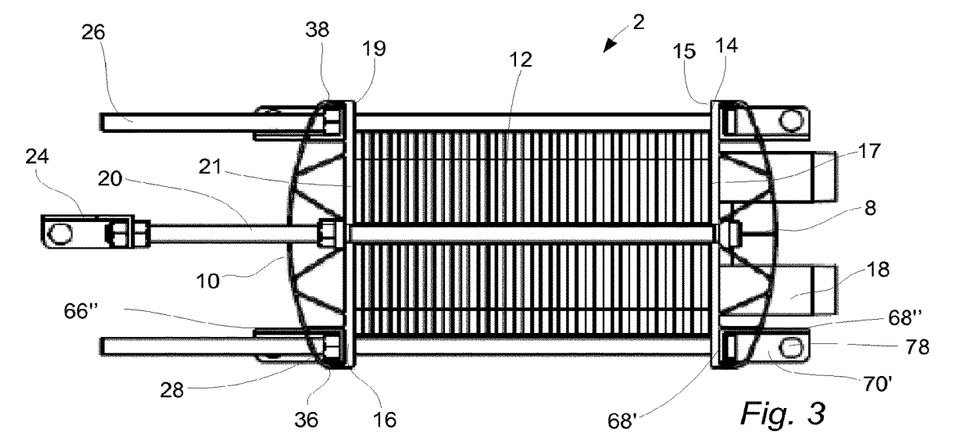
FIG. 3 is a top view of the plate heat exchanger of FIG. 1.
Figure 4:
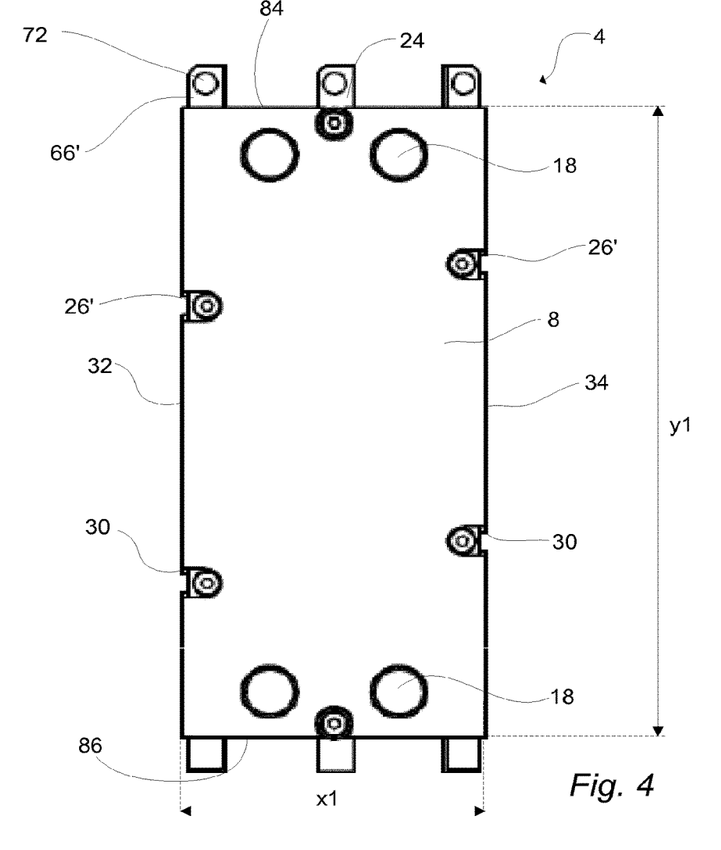
FIG. 4 is a front view of the plate heat exchanger of FIG. 1.

The bar 66' is longer than the first frame part 8 and it projects from two opposite second or short sides, 84 and 86, thereof, as is illustrated in FIG. 4. Thereby, the hole 72 is arranged outside the first frame part 8, more particularly above the same. Similarly, the hole 78 is arranged outside the first frame part 8, more particularly below the same and facing the ground. The holes 74 and 76 are, however, arranged within the first frame part 8. More particularly, they can be aligned with a respective one of the recesses 30.

As above described, when assembling the plate heat exchanger 2, the bolts 26 are inserted through recesses 30 of the first and second frame parts. In connection therewith, the bolts 26 are also inserted through one of the bars of the first frame part and one of the bars of the second frame part. Regarding the bar 66', the bolts are inserted through the holes 74 and 76 of the leg 68". When the nuts 28 are tightened, the bars 66 are fixed in relation to the frame parts 8 and 10. The bars 66 function as reinforcements around the recesses 30 where the frame parts are relatively weak. Without the reinforcing bars 66, there could be a risk of the frame parts breaking in the areas around the recesses 30 in connection with tightening of the nuts.

Figure 8:
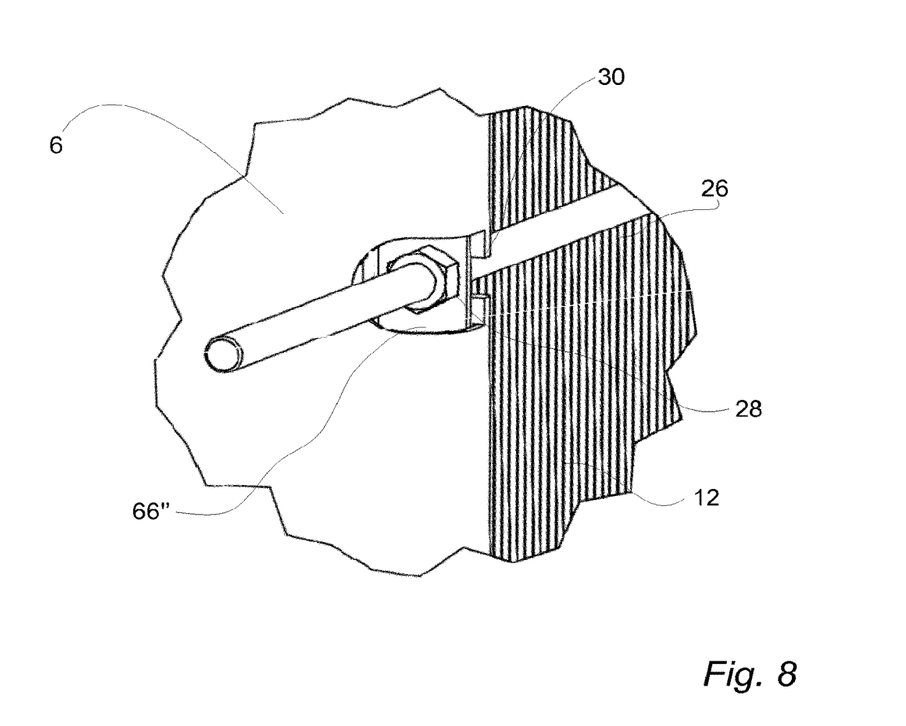
FIG. 8 is perspective view of a portion of the plate heat exchanger of FIG. 1.

As used herein, nut tightening refers to a relative operation. Thus, nut tightening can be achieved either by rotating the nut or the bolt. With that said, the bars 66 may also function as locking means in connection with tightening of nuts with certain designs, such as a conventional hexagonal contour, as is illustrated in FIG. 8 which shows another one, 66", of the bars 66. As apparent from the figure, the L-shape of the bars, or more particularly, that leg of the bars that comprises no holes, may prevent the nuts from rotating. Thus, by using bolts with suitably designed bolt heads, that is bolt heads that are not prevented from rotating by the presence of the bars, such as socket head bolts, the end-pieces can be pressed towards each other by rotating the bolt heads without manually holding the nuts. Also, that leg of the bars that comprises the holes may remove the need for those washers that are required for the bolt and nuts of conventional plate heat exchangers.

Thus, the bars 66 have a reinforcement and a locking function. However, also other clever functions may be integrated in the bars. The holes of the bars 66 arranged above the frame parts 8 and 10 (denoted 72 of the bar 66') can be used as lifting means whenever lifting of the plate heat exchanger 2 is required. In fact, these holes can be used as lifting means irrespective of whether the bolts are present or not because of the L-shape of the bars. The shorter second part of the bars will self-lock against the lower short sides of the frame parts. Further, the holes of the bars 66 arranged below the frame parts (denoted 78 of the bar 66') can be used as attachment devices, arranged to cooperate with e.g. bolts anchored to the ground, for fixing and supporting the plate heat exchanger 2. Integrating these lifting and fixing features in the bars eliminates the need for conventional means for lifting and fixing the plate heat exchanger. Such conventional means require that the end-pieces are longer than the heat transfer plates to enable engagement between the end-pieces and the lifting and fixing means. If the lifting and fixing features instead are integrated in the bars as suggested here, the end-pieces can have the same length as the heat transfer plates, which is material effective.

It should be noted that the support rod 24 of the plate heat exchanger 2 and the bars 66 are similar which makes the plate heat exchanger cheaper and easier to assembly.

Further, it should be said that the short sides of the frame parts are closed by casings as apparent from some of the figures. This is for reasons of hygiene and aesthetics.

Figure 9:
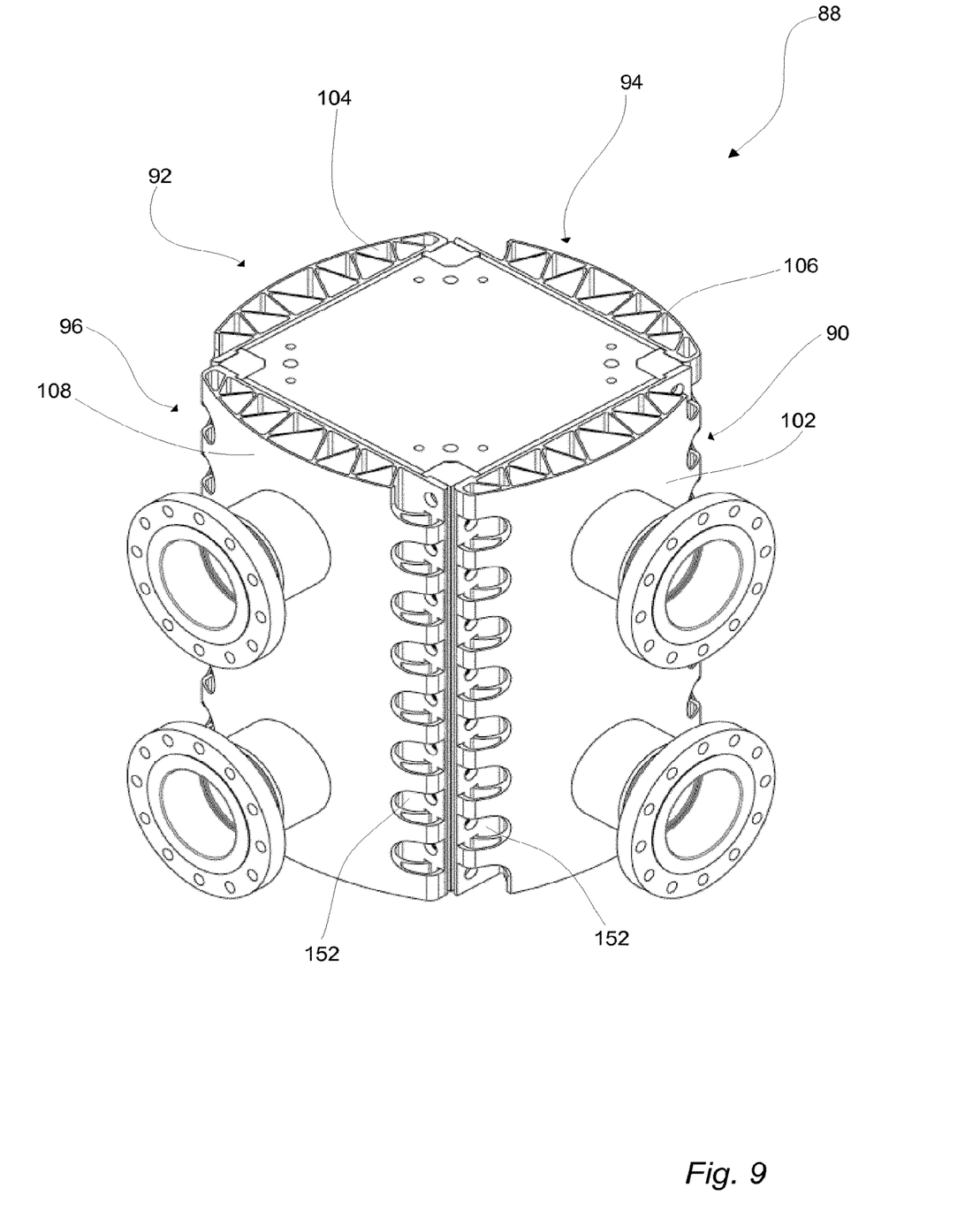
FIG. 9 is a perspective view of a welded plate heat exchanger.
Figure 10:
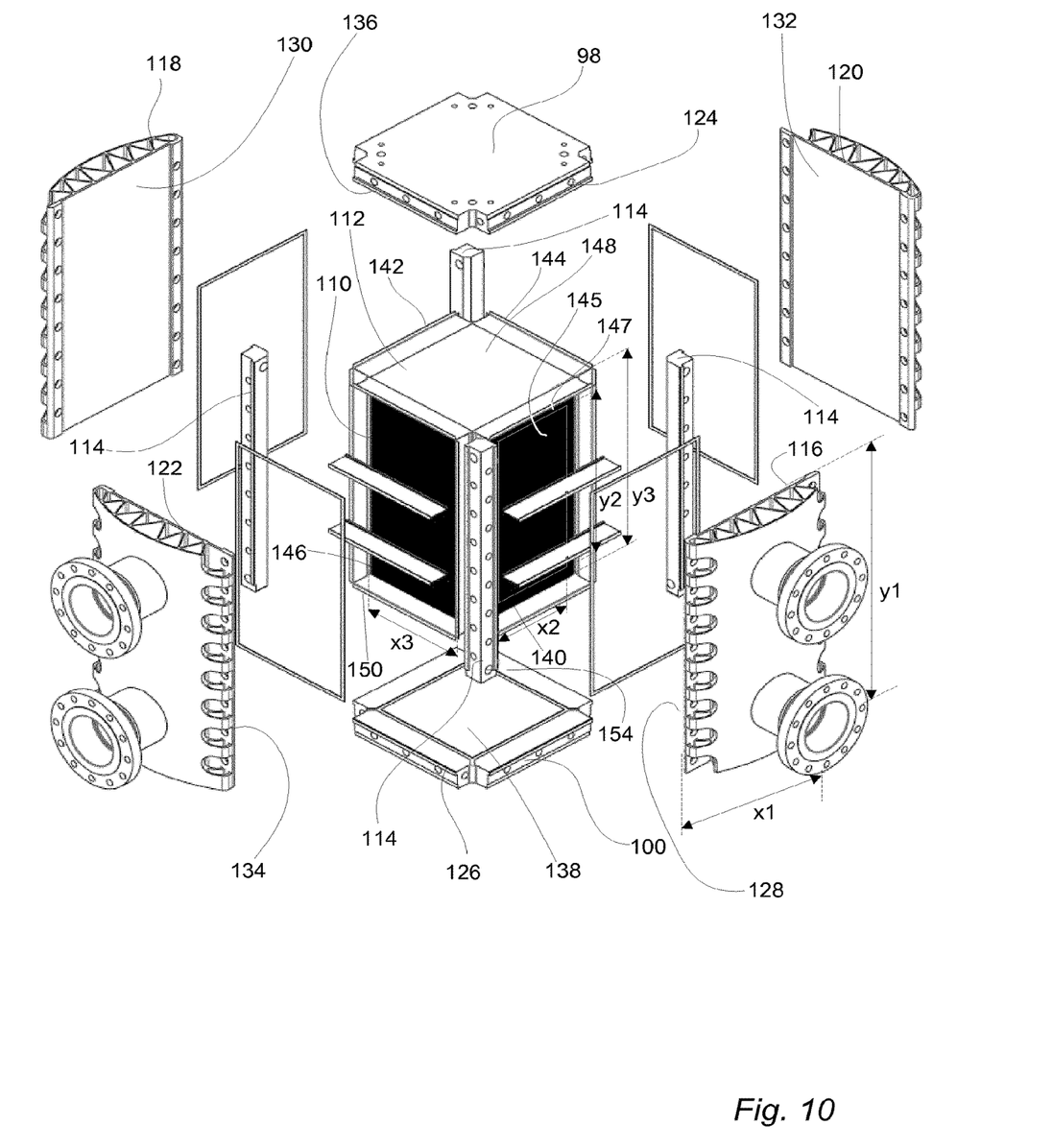
FIG. 10 is an exploded view of the plate heat exchanger of FIG. 9.

With reference to FIGS. 9-10, an all-welded block-type plate heat exchanger 88 is partially illustrated. It comprises a first, a second, a third, a fourth, a fifth and a sixth end-piece 90, 92, 94, 96, 98 and 100, respectively. The first, second, third and fourth end-pieces are side panels of the plate heat exchanger 88 and they are all constructed essentially as the above described end-pieces 4 and 6. Accordingly, the first, second, third and fourth end-pieces comprise a respective one of a first, a second, a third and a fourth frame part 102, 104, 106 and 108, respectively. The fifth and sixth end-pieces are top and bottom heads of the plate heat exchanger 88 and they are both conventionally designed. However, in an alternative embodiment, also the fifth and sixth end-pieces could be constructed essentially as the above described end-pieces 4 and 6.

The plate heat exchanger 88 further comprises a stack or package 110 of heat transfer plates 112. The package of heat transfer plates is all-welded why no gaskets are needed between the heat transfer plates for proper sealing of the flow channels between the plates. The first, second, third, fourth, fifth and sixth end-pieces 90, 92, 94, 96, 98 and 100, respectively, are arranged to be bolted (bolts not illustrated) to a set of corner girders 114 to form a box-like enclosure around the package 110 of heat transfer plates 112. Thus, in the assembled heat exchanger 88 the plate package 110 is arranged within respective inner portions 116, 118, 120, 122, 124 and 126 of the first, second, third, fourth, fifth and sixth end-pieces 90, 92, 94, 96, 98 and 100. More particularly, a respective outer wall surface 128, 130, 132, 134, 136 and 138 of the inner portions 116, 118, 120, 122, 124 and 126 faces a respective one of a first, a second, a third, a fourth, a fifth and a sixth surface 140, 142, 144, 146, 148 and 150 of the package 110 of heat transfer plates 112. Each of the inner portions and thus the outer wall surfaces has outer dimensions x1 and x2. The first and second surfaces 140 and 142 of the heat transfer plate package 110 are opposing and perpendicular to an extension plane of the heat transfer plates 112. Similarly, the third and fourth surfaces 144 and 146 are opposing and perpendicular to an extension plane of the heat transfer plates 112. Each of the first, second, third and fourth surfaces has outer dimensions x3 and y3. Further, the first, second, third and fourth surfaces each has a center portion, with outer dimensions x2 and y2, and a peripheral portion encircling the center portion, which portions, for the first surface, are denoted 145 and 147 in FIG. 10. The fifth and sixth surfaces 148 and 150 are opposing and parallel to an extension plane of the heat transfer plates 112.

As is clear from the figures, the inner portions 116, 118, 120 and 122 of the first, second, third and fourth end-pieces 90, 92, 94 and 96 extend outside the heat transfer plate package 110. In other words, x1>x3>x2 and y1>y3>y2.

As mentioned above, the end-pieces are arranged to be bolted to the corner girders. More particularly, the first, second, third and fourth frame parts 102, 104, 106 and 108 are each provided with recesses 152 along their longitudinal edges. The bolts are arranged to extend through a respective one of the recesses 152 and further into a corresponding hole 154 in one of the corner girders 114.

The general functioning and design of an all-welded block type plate heat exchanger is well known and will not be described in detail herein. Especially, components of the all-welded block type plate heat exchanger not relevant to the present invention will not be described here. Instead, reference is made to European patent application EP 2508831, hereby incorporated herein by reference.

As mentioned above, the construction of the first and second end-pieces 4 and 6 of the plate heat exchanger 2, and the first, second, third and fourth end-pieces 90, 92, 94 and 96 of the plate heat exchanger 88, are essentially similar. The above description focusing on the first end-piece 4 is thus valid also for the end-pieces 90, 92, 94 and 96. However, it is possible for the end-pieces of the welded heat exchanger to differ from the end-pieces of the gasketed heat exchanger in some ways. As an example, the inner portion 42 of the frame object 40 for forming an end-piece of a welded heat exchanger may be plain and have an even thickness since the end-pieces of the welded heat exchanger are not arranged to compress the package 110 of heat transfer plates 112.

Naturally, even if not illustrated in the figures, one or more of the end-pieces of the welded plate heat exchanger may comprises bars similar to the bars 66 described above.

Figure 11:
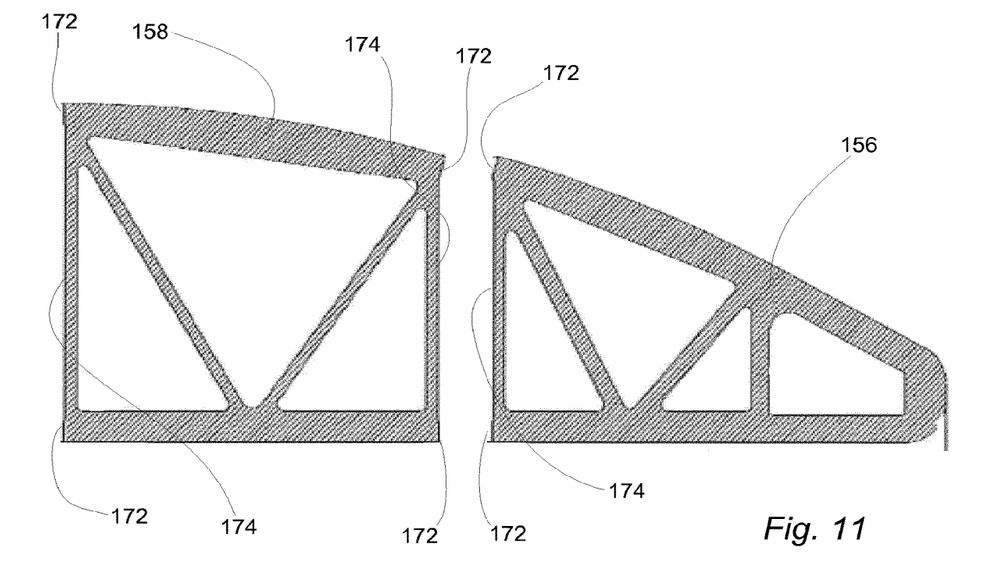
FIG. 11 is cross sectional view illustrating two frame object modules.
Figure 12:
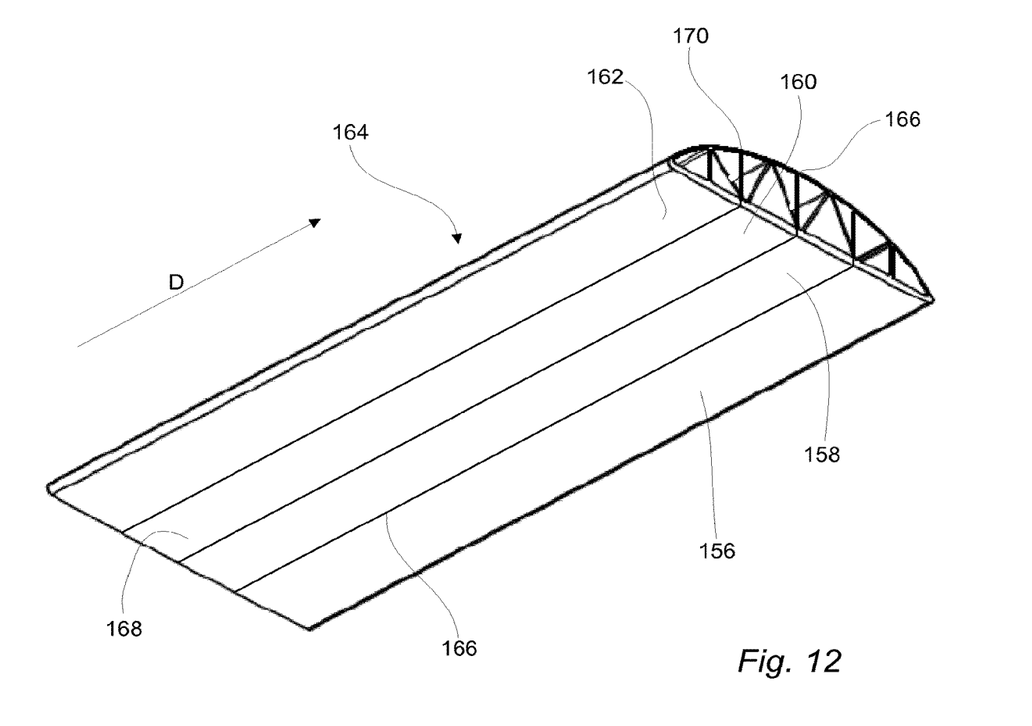
FIG. 12 is a perspective view illustrating a modular frame object.

As mentioned above, there is a limitation as regards how wide objects that can be extruded. To enable provision of end-pieces with widths exceeding a maximum extrusion width, the frame part of the end-piece, i.e. the frame object from which the frame part is produced, may comprise a plurality of extruded modules. Such modules 156, 158, 160 and 162 and such a modular frame object 164 are illustrated in FIGS. 11 and 12. The modules are connected side by side, by welding, along joints 166 extending parallel to the extrusion direction (D). Each two modules are connected by two opposing joints, one joint extending at least partly through an inner portion 168, and one joint extending at least partly through an outer portion 170, of the frame object 164. In FIG. 11 connection surfaces 172 of the modules 156 and 158 are illustrated. In assembling the frame object, each of the connection surfaces 172 of each of the modules is welded to a corresponding one of the connection surfaces 172 of an adjacent one of the modules. The connection surfaces are at least partly protruding from a boundary surface 174 of a respective one of the modules. Thereby, it becomes easier to achieve tight abutment between the modules. This is because the boundary surfaces may not be perfectly plane why it may difficult to achieve a tight abutment between two boundary surfaces. Thus, after welding of the modules to each other, there will be a narrow center slot between each two of the modules.

The modules can be welded to each other by different welding techniques. One example of such a technique is Friction Stir Welding by which the modules can be connected in a fast and strong way. More particularly, the weld joints achievable by Friction Stir Welding are as strong as the rest of the module structure. Further, by Friction Stir Welding more than one weld joint, such as the two opposing weld joints between two modules (mentioned above), can be produced at the same time, which enables a fast production rate. Moreover, long length modules can be welded together to produce long length frame objects that may be cut into shorter lengths, as desired, at a later stage. Naturally, also other module connection techniques than welding are conceivable. For example, the modules could be glued or screwed together.

Figure 13:
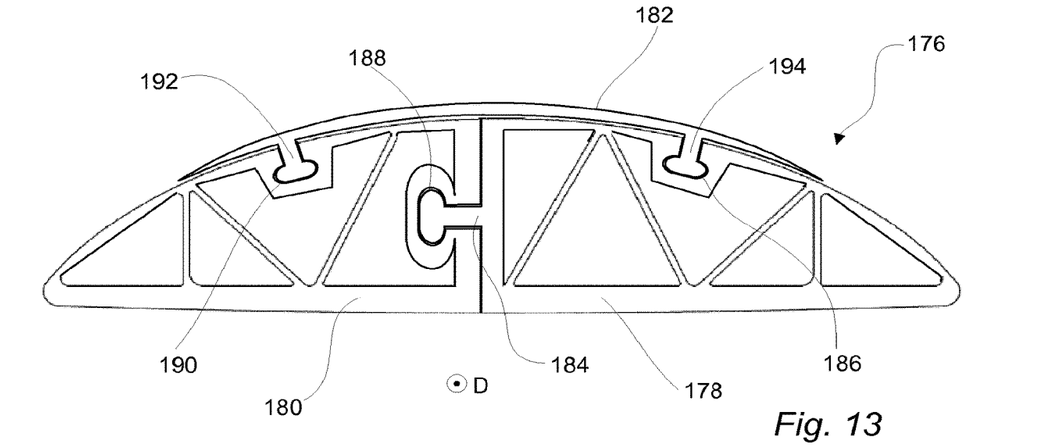
FIG. 13 is a schematic top view of an alternative modular frame object.

As another example, the modules could be connected by some sort of mechanical, self-locking means. FIG. 13 illustrates a modular extruded frame object 176 comprising a male module 178, a female module 180 and an outer module 182. The male module 178 comprises a projection 184 and a groove 186. The female module 180 comprises two grooves 188 and 190. The outer module 182 comprises two projections 192 and 194. All grooves and projections are extending along the extrusion direction D. As is illustrated in FIG. 13, the projection 184 of the male module 178 is received in the groove 188 of the female module 180, the projection 192 of the outer module 182 is received in the groove 190 of the female module 180 and the projection 194 of the outer module 182 is received in the groove 186 of the male module 178 to assemble the frame object 176.

Naturally, a modular extruded frame object can be constructed in numerous different ways. For example, it could comprise a male and a female module only, connected by one or more pairs of cooperating projections and grooves. It could also comprise two end modules and theoretically any number of intermediate modules, similar or different, all connected in line by some kind of self-locking means and/or welding and/or some other connection means. Self-locking means of different kinds are also conceivable in connection with the present invention, such as projections and grooves of alternate form, e.g. dove tail form.

Figure 14:
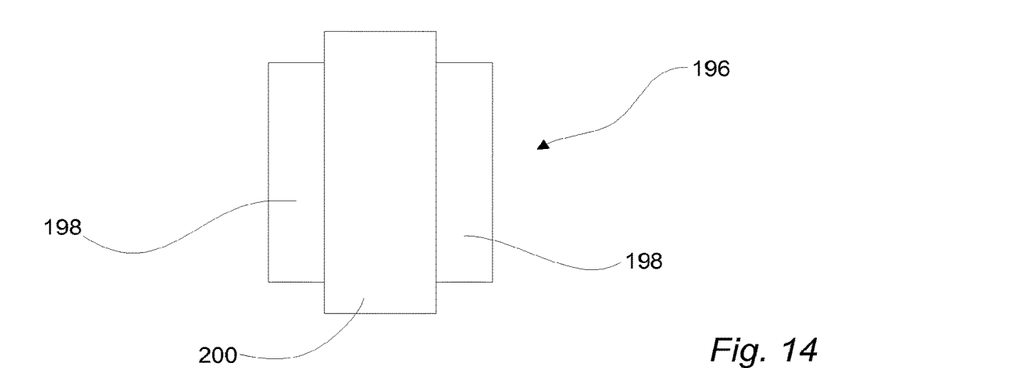
FIG. 14 is a schematic front view of an alternative modular frame object.

Modular extruded frame objects comprising modules of different widths and/or lengths are also conceivable. FIG. 14 illustrates a modular extruded frame object 196 comprising two essentially similar end modules 198 and a wider and longer intermediate module 200 to accommodate features like carrying and guide bars, tightening bolts, and lifting, supporting and fixing means. Thus, the frame object 196 is dimensioned so as to be larger locally, where required for incorporation of specific features in a resulting end-piece, which may save not only space but also material and thus money.

Thus, the core of the inventive plate heat exchangers described above is the extruded, non-solid frame parts. By extrusion it is possible to manufacture a frame part with a relatively complex design that is resistant to deformation in that it offers an effective load distribution. Still, the frame part is very material effective which is beneficial from an economical point of view. Also, since the frame part comprises cavities and can be made of a material with relatively low density, such as aluminum, it is relatively light. One advantage of using aluminum for the frame parts is that it does not require painting to become resistant like conventional carbon steel end plates.

The above described embodiments of the present invention should only be seen as examples. A person skilled in the art realizes that the embodiment discussed can be varied and combined in a number of ways without deviating from the inventive conception.

As an example, the frame parts can be made of any suitable, extrudable material, such as steel or a polymer.

As another example, the present invention could be used in connection with any type of plate heat exchanger, such as semi-welded plate heat exchangers and all types of plate heat exchangers with permanently joined heat transfer plates.

The design of the end-piece specified above and shown in the figures is just exemplary. Thus, the frame part could comprise any number and any design of the cavities and the partitioning walls. The partitioning walls do not have to be straight but could be angled or curved and even be connected to each other, so as to form, for example, a grid-like structure inside the frame parts. Further, the partitioning walls could have varying thicknesses and the design of one partitioning wall could differ from the design of another.

Further, the outer and inner portions of the frame parts could be separated from each other at the long sides. Moreover, the outer wall surface of the outer portion of the frame parts could be cornered like the inner wall surface instead of being smooth. Also, one or more partitioning walls could join each one of the inner and outer contact areas of the inner and outer portions of the frame parts.

Furthermore, bars with different designs than the above described ones could be used. For example, bars with rectangular or U-shaped cross sections could be used instead of bars with L-shaped cross section. Naturally, the design of the bars determines the functions of them. Further, more than one bar may extend inside one and the same cavity. Also, the bars need not extend along the complete cavity. Finally, the bars could be arranged in other cavities than the outer ones.

Figure 15:
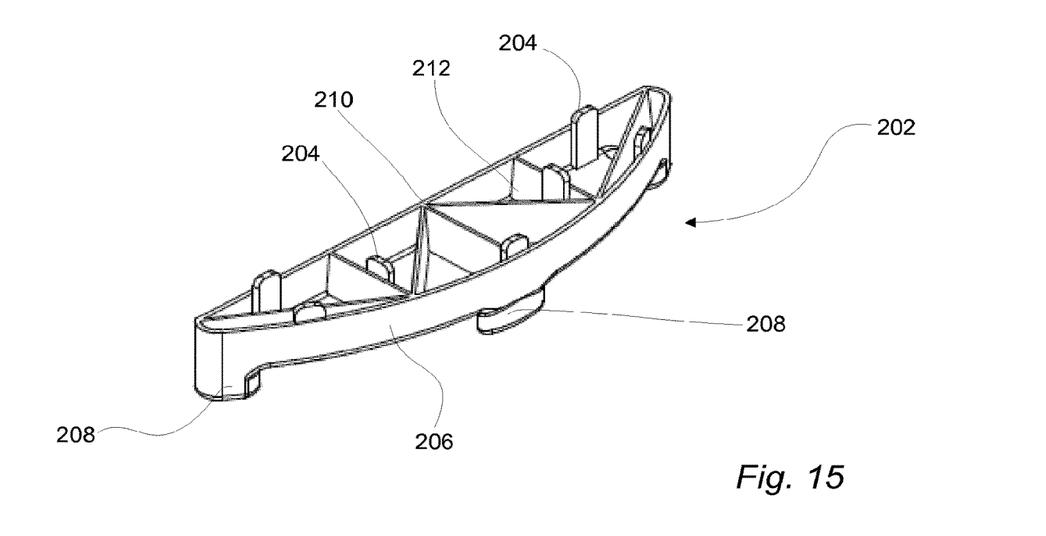
FIG. 15 is perspective view of a support connectable to a frame part according to the present invention.

As mentioned above, the second or short sides of the frame parts may be closed by casings and bars may extend through the frame part and beyond the lower short side of the same for, inter alia, supporting and fixing the frame part. According to an alternative embodiment, the inventive frame part could be provided with a polymeric support which illustrated in FIG. 15 and denoted with numeral 202. The support 202 comprises a number of projections 204 arranged to be inserted into the cavities 52 of the frame object 40 (see FIGS. 4 and 5) from the short side 86 thereof and engage with the inside walls defining these cavities. A base 206 of the support is arranged to extend outside the frame object or frame part and it comprises feet 208 adapted for contact with the ground. As is clear from FIG. 15, the support 202 may have a partly hollow structure and comprise a framework 210 and cavities 212, which makes the support light and material effective but still strong. For a frame part provided with the support 202, a casing for closing the lower short side may not be needed. Further, the bars, if present, may not have to extend beyond the lower short side to support the frame part. This is because the support is arranged to both close the lower short side and support the frame part.

Naturally, the support 202 could be of other materials than polymeric materials.

The inner portion of the above frame part has an essentially plane inner wall surface and a slightly convex outer wall surface. Thus, the thickness of the inner portion is varying. Of course, other designs of the frame part inner portion are possible. As an example, both the inner and the outer wall surface of the frame part inner portion could be slightly convex. Alternatively, as mentioned above, they could both be essentially plane. In both cases, the inner portion could then have a constant thickness.

In the above described plate heat exchanger, bolts and nuts are arranged to cooperate with each other and with the recesses of the frame parts to press the end-pieces towards each other. Naturally, other means could be used to press the end-pieces towards each other.

The above described support rod may not be necessary in connection with some plate heat exchanger types since the bars offers support and fixing solutions for both of the end-pieces.

The above described L-shape of the bars offer a locking solution for the nuts. Naturally, the bars could instead offer a locking solution for the bolt heads. In accordance therewith, the end-pieces would be pressed towards each other by rotating the nuts instead of the bolts. Furthermore, other locking solutions are conceivable. As an example, the nuts, or the bolt heads, could be permanently attached, for example welded, to the bars.

It should be stressed that a description of details not relevant to the present invention has been omitted and that the figures are just schematic and not drawn according to scale. It should also be said that some of the figures have been more simplified than others. Therefore, some components may be illustrated in one figure but left out on another figure.

What is claimed is:

1. A method of making an end-piece for a plate heat exchanger, the end-piece comprising a frame part, which frame part has an inner portion, an outer portion and an intermediate portion arranged between the inner and outer portions, an outer wall surface of the inner portion being arranged to face a first surface of a package of heat transfer plates comprised in the plate heat exchanger, the first surface having a center portion and a peripheral portion encircling the center portion, the method comprising extruding the frame part with a number of cavities comprised in the intermediate portion of the frame part, the cavities extending in an extrusion direction of the frame part, which extrusion direction is parallel to an axis of the frame part, and with outer dimensions of the outer wall surface of the inner portion at least configured to be as large as outer dimensions of the center portion of the first surface of the package of heat transfer plates.

2. The method according to claim 1, wherein the extruding of the frame part comprises extruding the frame part so that the intermediate portion of the frame part comprises a plurality of partition walls each extending between an inner wall surface of the outer portion and an inner wall surface of the inner portion.

3. The method according to claim 1, wherein the extruding of the frame part comprises extruding the frame part so that the outer portion includes an inner wall surface that faces an inner wall surface of the inner portion, and so that the outer portion includes an outer wall surface that is curved.

4. The method according to claim 1, wherein the extruding of the frame part comprises extruding the frame part so that a thickness of the inner portion varies in a direction transverse to the extrusion direction of the first frame part.

5. The method according to claim 1, wherein the extruding of the frame part comprises extruding the frame part so that the outer portion includes an inner wall surface that faces an inner wall surface of the inner portion, and so that the inner wall surface of the inner portion is planar.

6. The method according to claim 1, wherein the extruding of the frame part comprises extruding the frame part so that: i) the outer portion includes an inner wall surface that faces an inner wall surface of the inner portion; ii) the intermediate portion of the frame part comprises a plurality of partition walls each extending between a connection area at the inner wall surface of the outer portion and a connection area at the inner wall surface of the inner portion; and iii) the inner wall surface of the outer portion is planar between at least some adjacent connection areas.

7. The method according to claim 1, wherein the outer portion includes an inner wall surface facing towards an inner wall surface of the inner portion, the outer portion including an outer wall surface opposite the inner wall surface of the outer portion, the inner portion including an inner wall surface opposite the outer wall surface of the inner portion, the extruding of the frame part comprising extruding the frame part so that a distance between the outer wall surface of the outer portion and the outer wall surface of the inner portion of the frame part is larger in an intermediate section of the frame part than outside sections of the frame part outside the center section, the intermediate section being between the outside sections as seen in a cross-section of the frame part transverse to the extrusion direction.

8. The method according to claim 1, wherein the extruding of the frame part comprises extruding the frame part so that a thickness of the outer portion of the frame part is less than a thickness of the inner portion of the frame part.

9. The method according to claim 1, wherein the inner portion includes an inner wall surface facing towards an inner wall surface of the outer portion, the extruding of the frame part comprising extruding the frame part so that at least one projection extends from the inner wall surface of the inner portion towards the outer portion, the at least one projection having a free end.

10. The method according to claim 1, wherein the extruding of the frame part comprises extruding the frame part so that: i) the intermediate portion of the frame part comprises a plurality of spaced apart partition walls extending between the outer portion and the inner portion; and ii) at least one of the partition walls includes a projection extending away from the at least one partition wall, the at least one projection having a free end.

11. A method of making an end-piece having a longitudinal axis and configured for use in a plate heat exchanger that includes a package of heat transfer plates, the method comprising:
   extruding a frame part in an extrusion direction parallel to the longitudinal axis so that the frame part comprises an inner portion, an outer portion spaced from the inner portion, and an intermediate portion between the inner portion and the outer portion, the inner portion of the frame part possessing an outer wall surface configured to face a first surface of the package of heat transfer plates; and
   the extruding of the frame part comprising extruding the frame part so that the intermediate portion of the frame part comprises a plurality of cavities extending in the extrusion direction and separated from one another.

12. The method according to claim 11, wherein the extruding of the frame part comprises extruding the frame part so that the plurality of cavities are separated from one another by partition walls.

13. The method according to claim 11, wherein the extruding of the frame part comprises extruding the frame part so that the plurality of cavities are separated from one another by partition walls that are each connected to the inner portion and the outer portion.

14. The method according to claim 11, wherein the extruding of the frame part comprises extruding the frame part so that the outer portion includes an inner wall surface that faces an inner wall surface of the inner portion, and so that the outer portion includes an outer wall surface that is curved.

15. The method according to claim 11, wherein the extruding of the frame part comprises extruding the frame part so that a thickness of the inner portion varies in a direction transverse to the extrusion direction of the first frame part.

16. The method according to claim 11, wherein the extruding of the frame part comprises extruding the frame part so that the outer portion includes an inner wall surface that faces an inner wall surface of the inner portion, and so that the inner wall surface of the inner portion is planar.

17. The method according to claim 11, wherein the extruding of the frame part comprises extruding the frame part so that: i) the outer portion includes an inner wall surface that faces an inner wall surface of the inner portion; ii) the plurality of cavities are separated from one another by partition walls each extending between a connection area at the inner wall surface of the outer portion and a connection area at the inner wall surface of the inner portion; and iii) the inner wall surface of the outer portion is planar between at least some adjacent connection areas.

18. The method according to claim 11, wherein the outer portion includes an inner wall surface facing towards an inner wall surface of the inner portion, the outer portion including an outer wall surface opposite the inner wall surface of the outer portion, the inner portion including an outer wall surface opposite the inner wall surface of the inner portion, the extruding of the frame part comprising extruding the frame part so that a distance between the outer wall surface of the outer portion and the outer wall surface of the inner portion of the frame part is larger in an intermediate section of the frame part than outside sections of the frame part outside the center section, the intermediate section being between the outside sections as seen in a cross-section of the frame part transverse to the extrusion direction.

19. The method according to claim 11, wherein the extruding of the frame part comprises extruding the frame part so that a thickness of the outer portion of the frame part is less than a thickness of the inner portion of the frame part.

20. A method comprising:
extruding a frame part in an extrusion direction to produce an extruded frame part comprising an inner portion, an outer portion having an inner wall surface facing towards and spaced from an inner wall surface of the inner portion, and an intermediate portion between the inner wall surface of the inner portion and the inner wall surface of the outer portion, the inner portion of the extruded frame part possessing an outer wall surface opposite the inner wall surface of the inner portion of the extruded frame part;

the extruding of the frame part comprising extruding the frame part so that the intermediate portion of the extruded frame part comprises a plurality of cavities extending in the extrusion direction and separated from one another;

positioning a package of heat transfer plates between the extruded frame part, which constitutes one end-piece of a plate heat exchanger, and a second end-piece so that the outer wall surface of the extruded frame part faces a first surface of the package of heat transfer plates, the first surface of the package of heat transfer plates including a center portion and a peripheral portion encircling the center portion, the outer wall surface of the inner portion possessing outer dimensions at least as large as outer dimensions of the center portion of the first surface of the package of heat transfer plates.

\* \* \* \* \*